(12) United States Patent
Ohshima (10) Patent No.: US 8,624,987 B2
(45) Date of Patent: Jan. 7, 2014

(54) IMAGE CAPTURING APPARATUS, METHOD OF CONTROLLING THE SAME, AND PROGRAM THEREFOR

(75) Inventor: Hideaki Ohshima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 217 days.

(21) Appl. No.: 12/834,749

(22) Filed: Jul. 12, 2010

(65) Prior Publication Data

US 2011/0019017 A1  Jan. 27, 2011

(30) Foreign Application Priority Data

Jul. 24, 2009 (JP) ................................. 2009-173437

(51) Int. Cl.
*H04N 5/232* (2006.01)
(52) U.S. Cl.
USPC ...................................................... 348/211.1
(58) Field of Classification Search
USPC ......................................................... 725/105
See application file for complete search history.

(56) References Cited

U.S. PATENT DOCUMENTS

| 2003/0156706 A1* | 8/2003 | Koehler et al. | 379/265.05 |
| 2007/0076251 A1 | 4/2007 | Yasuda | |
| 2007/0236583 A1* | 10/2007 | Vuong et al. | 348/231.99 |
| 2008/0068675 A1* | 3/2008 | Sakuda | 358/474 |

FOREIGN PATENT DOCUMENTS

| JP | 2007-97052 A | 4/2007 |
| JP | 2008-42552 A | 2/2008 |

* cited by examiner

*Primary Examiner* — Roberto Velez
*Assistant Examiner* — Yih-Sien Kao
(74) *Attorney, Agent, or Firm* — Carter, DeLuca, Farrell & Schmidt LLP (57) ABSTRACT

A communication apparatus is provided, which discloses a plurality of control content items to an external apparatus. The control content items are used to cause the communication apparatus to perform processing for generating content, and to generate different content in different formats. If one of the plurality of the control content items is requested from the external apparatus, the communication apparatus performs processing according to the requested control content, and transmits the generated content. The disclosed control content items are each in a format of the content generated in the processing according to the control content.

22 Claims, 7 Drawing Sheets

IMAGE CAPTURING APPARATUS, METHOD OF CONTROLLING THE SAME, AND PROGRAM THEREFOR

BACKGROUND OF THE INVENTION

1. Field of the Invention

The present invention relates to an image capturing apparatus, and a method of controlling the same, and a program therefor.

2. Description of the Related Art

In recent years, the trade organization Digital Living Network Alliance (DLNA®) established guidelines for mutually sharing digital content such as still images, moving images, and voice between devices from different manufacturers, and the guidelines now are widespread. DLNA compliant devices can transmit/receive digital content between a digital media server (DMS) that provides the digital content and a digital media player (DMP) that displays the digital content. Thereby, the DMP can display the digital content provided from the DMS.

Japanese Patent Application Laid-Open No. 2007-97052 discusses a technology that enables display of image data in real time on an image display apparatus after a reading apparatus such as a scanner reads the data.

Japanese Patent Application Laid-Open No. 2008-42552 discusses a technology that enables direct transmission and display of image data to and on an image display apparatus via a network when a reading apparatus such as a scanner reads the data.

The former patent literature, however, only referred to the technology to control a start of reading by a display apparatus from a reading apparatus that serves as an image provider. There is no reference to other controls.

In contrast, the latter patent literature discusses a technology to control a change in settings, in addition to the control of reading by a display apparatus as to the content provided from a reading apparatus that serves as an image provider. The technology, however, requires a display apparatus to have a file for determining setting values.

SUMMARY OF THE INVENTION

The present invention is directed to a technology that enables various controls on an image capturing apparatus that provides content from an external apparatus, and does not require the external apparatus to have information such as setting files.

According to an aspect of the present invention, an image forming apparatus includes a communication apparatus that transmits content recorded in a recording medium to an external apparatus in response to a request for the content from the external apparatus. The communication apparatus includes a disclosure unit to disclose control content items to the external apparatus. The control content items may be used to cause the communication apparatus to perform processing for generating the content, and to generate content in different formats, respectively. The communication apparatus also includes a generation unit to generate content, if one of the control content items is requested from the external apparatus, by performing processing corresponding to the requested control content item. The communication apparatus further includes a transmission unit to transmit the content generated by the generation unit. Each control content item disclosed by the disclosure unit is in a format that is the same as that of content generated in processing according to the requested control content item.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2 is a flowchart illustrating a process to transmit content information to be disclosed to a display apparatus after a digital camera is turned on.

DESCRIPTION OF THE EMBODIMENTS

Exemplary embodiments, features, and aspects of the present invention will now be described in detail below with reference to the attached drawings.

In the following exemplary embodiments, a digital camera 100, which is an image capturing apparatus, serves as a content providing server. A display apparatus 200 displays content. A network connects the digital camera 100 and the display apparatus 200 to communicate with each other.

Figure 1:
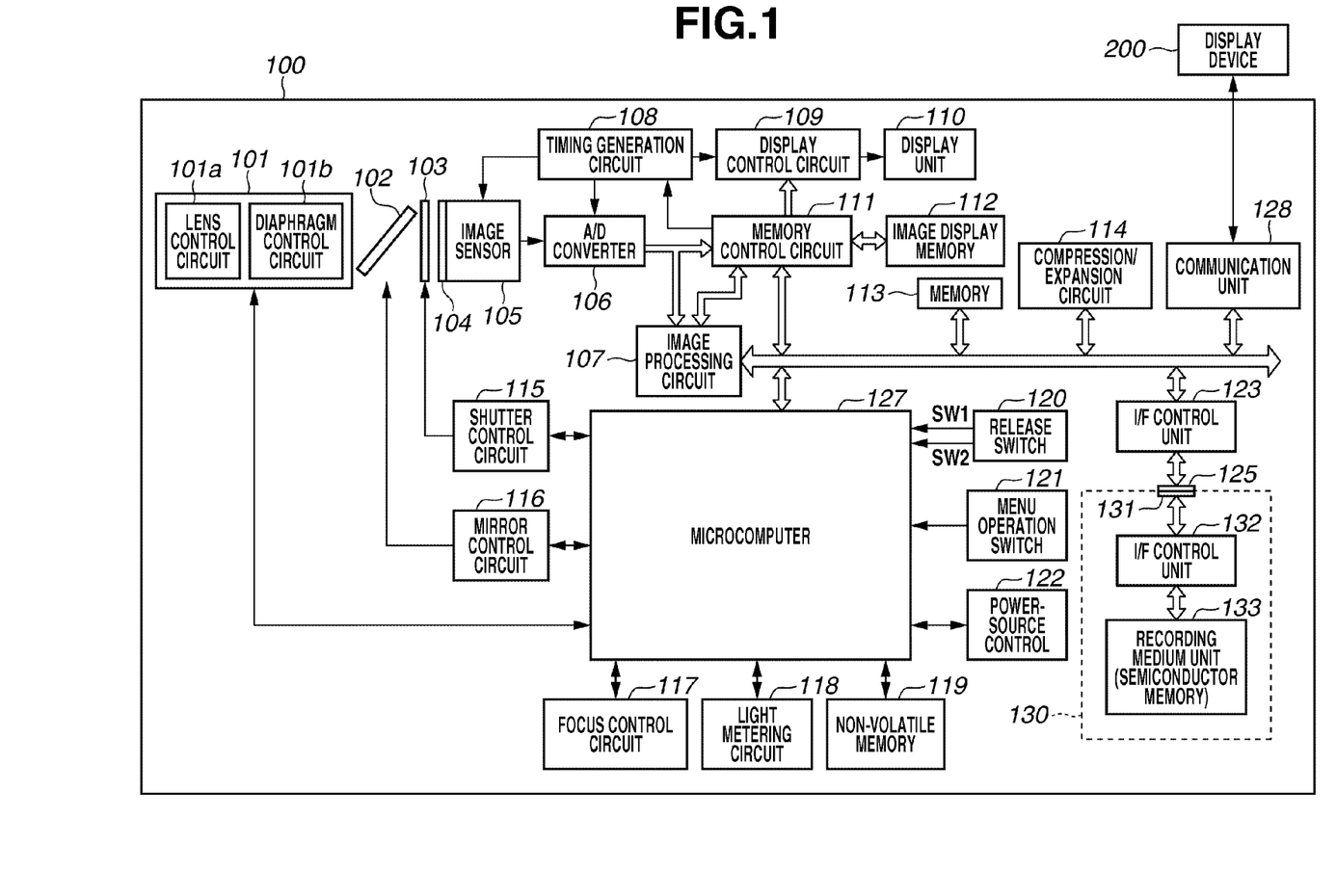
FIG. 1 illustrates a hardware configuration of a digital camera.

FIG. 1 illustrates a hardware configuration of a digital camera according to a first exemplary embodiment according to the present invention.

The digital camera 100 has a lens unit 101. The lens unit 101 is configured with a plurality of lenses and is interchangeable. The lens unit 101 includes a lens control circuit 101a and a diaphragm control circuit 101b, and can communicate with a microcomputer 127. The microcomputer 127 controls the lens control circuit 101a to move and focus a focusing lens in the lens unit 101. The amount of lens movement is calculated based on an output from a focus control circuit 117. The microcomputer 127 controls the diaphragm control circuit 101b to change an optical aperture value.

The digital camera 100 includes a quick-return mirror 102, a shutter 103, an optical filter 104, an image sensor 105, an analog-to-digital (A/D) converter 106, and a timing generation circuit 108. The quick-return mirror 102 is disposed in a photographing optical path to move between a position where the mirror leads light of an object from the lens unit 101 to a finder optical system (not illustrated) and a position where the mirror is retracted from the optical path. The optical filter 104 is covered with a dust-shielding glass plate. The image sensor 105 converts optical images into electrical signals. The A/D converter 106 converts analogue signals output from the image sensor 105 into digital signals. The timing generation circuit 108 supplies clock signals and control signals to the image sensor 105 and the A/D converter 106. A memory control circuit 111 and a microcomputer 127, which will be described later, control the timing generation circuit 108.

The digital camera 100 further includes an image processing circuit 107, an image display circuit 109, a memory control circuit 111, an image display memory 112, a display unit 110, and a memory 113. The image processing circuit 107 applies predetermined pixel interpolating processing and development processing to data from the A/D converter 106 and data from the memory control circuit 111, based on processing data added to the image data. The memory control circuit 111 controls the A/D converter 106, the image processing circuit 107, the timing generation circuit 108, the image display memory 112, the memory 113, and the compression/expansion circuit 114. The signals converted by the A/D converter 106 are written into the image display memory 112 or the memory 113 via the image processing circuit 107 and the memory control circuit 111.

The display unit 110 is a display such as thin film transistor liquid crystal display (TFT-LCD). The image data written in the image display memory 112 for display is displayed on the display unit 110 by the image display circuit 109. The memory 113 is used as an image buffer area that temporarily stores image data that is not compressed after captured. The memory 113 also is used as a work buffer area that stores processing data for development processing of image data at the image processing circuit 107, autofocus (AF)/auto-exposure (AE)/auto white balance (AWB) (AF/AE/AWB) calculation results, and other data that is temporarily used. In addition, the memory 113 also is used as a file buffer that stores image data compressed at the compression/expansion circuit 114. The memory 113 has a capacity sufficient to store a predetermined number of still images and a predetermined volume of moving images. Accordingly, a large volume of images can be written into the memory 113 at high speed even in the case of continuous shooting where a plurality of still images is captured sequentially.

The digital camera 100 further includes a compression/expansion circuit 114, a shutter control circuit 115, a mirror control circuit 116, a focus control circuit 117, a light metering circuit 118, a microcomputer 127, and a non-volatile memory 119.

The compression/expansion circuit 114 compresses/expands image data to Joint Photographic Experts Group (JPEG) data, using an adaptive discrete cosine transform (ADCT) for example. The compression/expansion circuit 114 reads image data from the memory 113, and writes the data into the memory 113 after compression/expansion processing thereof. The shutter control circuit 115 controls the shutter 103. The mirror control circuit 116 drives and controls the quick-return mirror 102 to move into and out of the photographing optical path. The focus control circuit 117 measures a distance between the focusing lens in the lens unit 101 and an object, and controls the focusing lens based on the distance. The light metering circuit 118 measures a luminance of an object, and controls an exposure based on the luminance. The microcomputer 127 controls the overall digital camera 100. The non-volatile memory 119 stores various programs including an image capturing processing program, an image processing program, and a program for recording image file data on a recording medium as created there. The non-volatile memory 119 stores other programs such as an operation system (OS) that runs multitasking of the above programs, and adjustment values for various controls.

The digital camera 100 further includes various operation units. The operation units include button switches, dials, and touch panels that are used by a user to input various operating instructions to the microcomputer 127. These operation units will be specifically described here. A release switch 120 includes a SW1 mode when the switch 120 is half-way pressed and a SW2 mode when the switch 120 is fully pressed. In the SW1 mode of the release switch 120, the microcomputer 127 starts shooting preparation such as auto-focus (AF) processing and auto-exposure (AE) processing.

In the SW2 mode of the release switch 120, the microcomputer 127 starts the following processing. The microcomputer 127 performs image capturing processing that includes reading signals from the image sensor 105 and writing the signals into the memory 113 via the A/D converter 106 and the memory control circuit 111. The microcomputer 127 also performs: white-balance correction processing according to a white-balance mode set for image data, using the image processing circuit 107, and development processing. Furthermore, the microcomputer 127 performs recording processing that includes reading developed image data from the memory 113, compressing the data at the compression/expansion circuit 114, and writing the data into a recording medium.

A menu operation switch 121 includes menu keys, set keys, and cross keys (not illustrated). A user can use the menu operation switch 121 to input various instructions such as a change in setting of shooting and developing conditions of the camera and a selection of power-saving mode of an external recording medium, while checking a screen displayed on the display unit 110.

Next, units and components connected to the digital camera 100 will be described. The digital camera 100 includes a power source control circuit 122, an interface (I/F) control unit 123, and a connector 125. The power source control circuit 122 includes a battery detection circuit, a DC-DC converter, and a switch circuit that switches blocks to be turned on. The power source control circuit 122 detects presence of battery, type of the battery, and an amount of remaining power of the battery. The power source control circuit 122 controls the DC-DC converter in response to detected results and instructions from the microcomputer 127, and supplies power of an adequate voltage to each unit including a recording medium for an adequate period.

The I/F control unit 123 controls a recording medium such as a memory card. The connector 125 connects the digital camera 100 to a recording medium such as a memory card.

The digital camera 100 includes a communication unit 128. The communication unit 128 controls transmission/reception of information and content between the digital camera 100 and the display apparatus 200. The communication unit 128 controls communication between the digital camera 100 and the display apparatus 200 via a communication path such as wireless LAN and wired LAN.

The digital camera 100 is provided with a recording medium 130 such as a memory card and a hard disk. The recording medium 130 includes a storage medium unit 133 composed of a semiconductor memory, and an I/F control unit 132 that is an interface to the digital camera 100 and controls the storage medium unit 133. The recording medium 130 also includes a connector 131 that is connected to the digital camera 100. In the exemplary embodiment, the recording medium 130 is a memory card configured with a semiconductor memory. The digital camera 100 has a housing provided with an inlet through which the recording medium 130 is inserted. The inlet of the digital camera 100 is provided with an openable/closable lid that covers the opening of the inlet.

When the microcomputer 127 executes processing according to a predetermined program, processing in a flowchart, which will be described later, is run on the digital camera 100.

The display apparatus 200 has hardware such as a central processing unit (CPU), a memory, and a display. When the CPU of the display apparatus 200 executes processing according to a program stored in the memory of the display apparatus 200, processing in a flowchart, which will be described later, is run on the display apparatus 200.

<Content Providing Process Flow>

Figure 2:
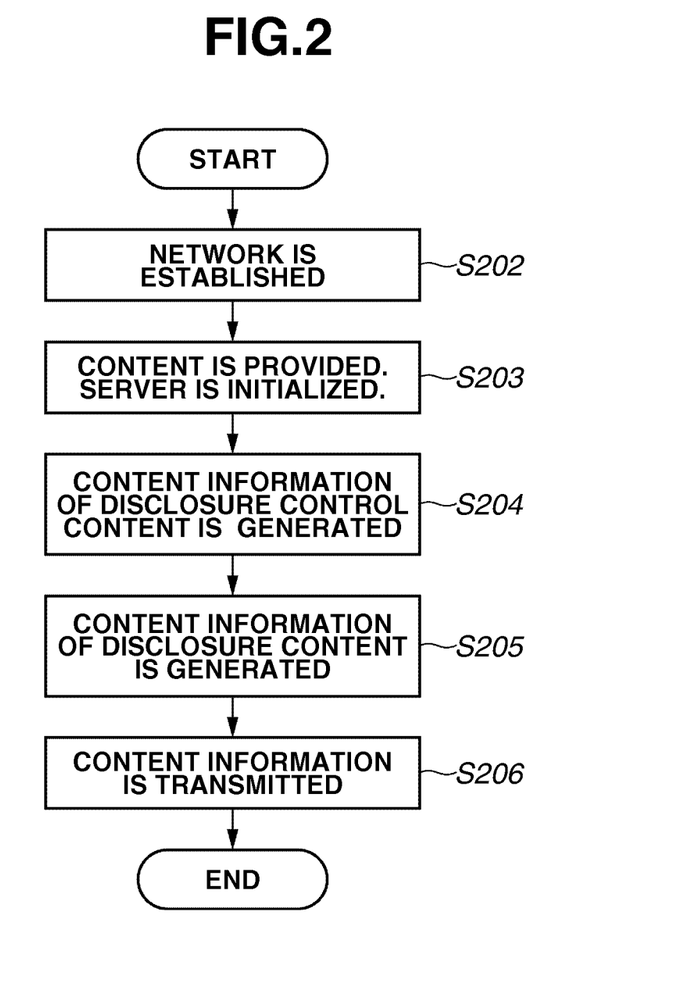

FIG. 2 is a flowchart illustrating a process flow for transmitting content information to be disclosed to a display apparatus after a digital camera is turned on.

An instruction from a user activates the digital camera 100, and starts the following process. In S202, the digital camera 100 establishes a network via the communication unit 128. The establishment of the network requires necessary items such as Internet Protocol (IP) address of the digital camera 100. The digital camera 100, in addition to the requirements set therein, is supposed to have a network configuration using a protocol such as Transmission Control Protocol/Internet Protocol (TCP/IP).

In S203, the digital camera 100 is initialized to function as a content providing server. In this exemplary embodiment, the digital camera 100 functions as a digital media server (DMS). The digital camera 100 has a still-image capturing function and a moving-image capturing function. The digital camera 100 further has a function to change camera setting in each image capturing mode.

In S204, the digital camera 100 generates control content that is associated with a start control of still-image capturing, in a format of image content that is generated in the still image capturing (e.g., JPEG file format). The digital camera 100 also generates control content that is associated with a start control of moving-image capturing, in a format of image content that is generated in the moving image capturing (e.g., MPEG4 file format). In the exemplary embodiment, the digital camera 100 also generates control content that is associated with a change in camera setting, in a format of voice content (e.g., MP3 file).

Figure 3:
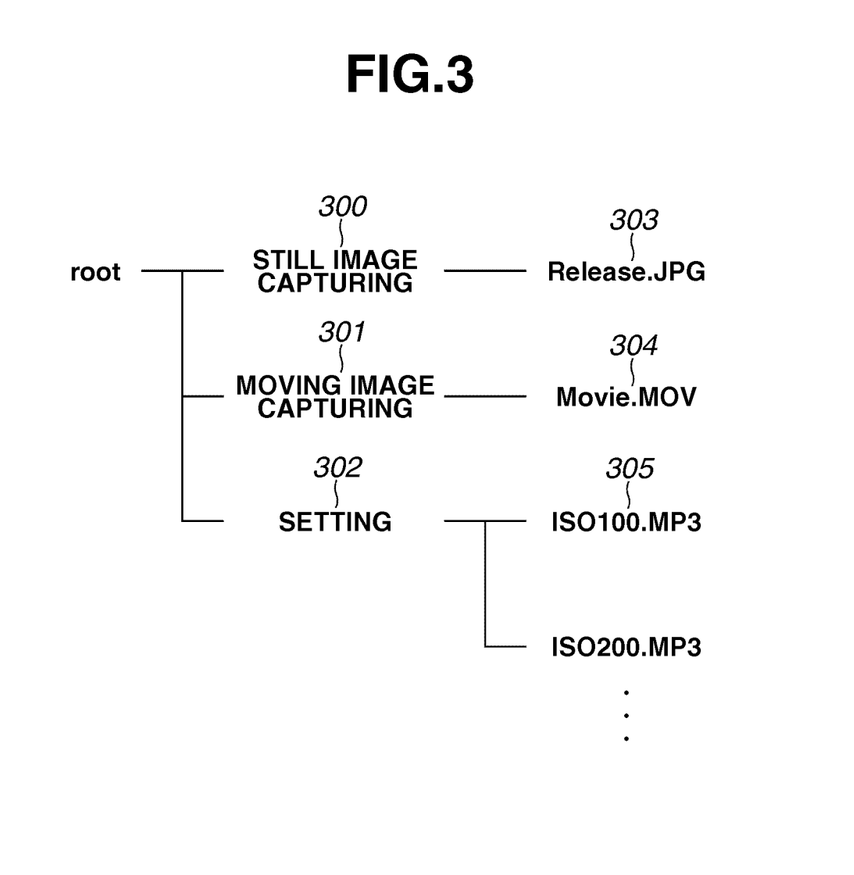
FIG. 3 illustrates a folder configuration of control content to be disclosed to a display apparatus.

FIG. 3 illustrates a folder configuration of control content disclosed to a display apparatus. The disclosure here refers to notification of the content managed by its own apparatus, by the digital camera 100 to the display apparatus 200. In FIG. 3, the configuration has control content "Release.JPG" 303, under a folder 300 for still image capturing, which is associated with a start control of still image capturing (control information for starting still image capturing). In response to a request from a display apparatus to obtain the control content Release.JPG 303, the digital camera 100 starts to capture still images. The control content indicates an access to content in the digital camera 100 from an external device, and controls and causes the digital camera 100 to execute predetermined operations. In FIG. 3, the configuration has control content Movie.MOV 304, under a folder 301 for moving image capturing, which is associated with a start control of moving image capturing (control information on start of moving image capturing). In this exemplary embodiment, content for setting change is provided as control content in MP3 format. The format of the content may be any format other than voice files. In FIG. 3, the configuration has control content ISO100.MP3 305, under a setting folder 302, which is associated with a change control to ISO 100.

Referring to FIG. 2 again, in S205, the digital camera 100 generates content information of digital content in the recording medium 130 for example that is inserted into the digital camera 100.

Figure 4:
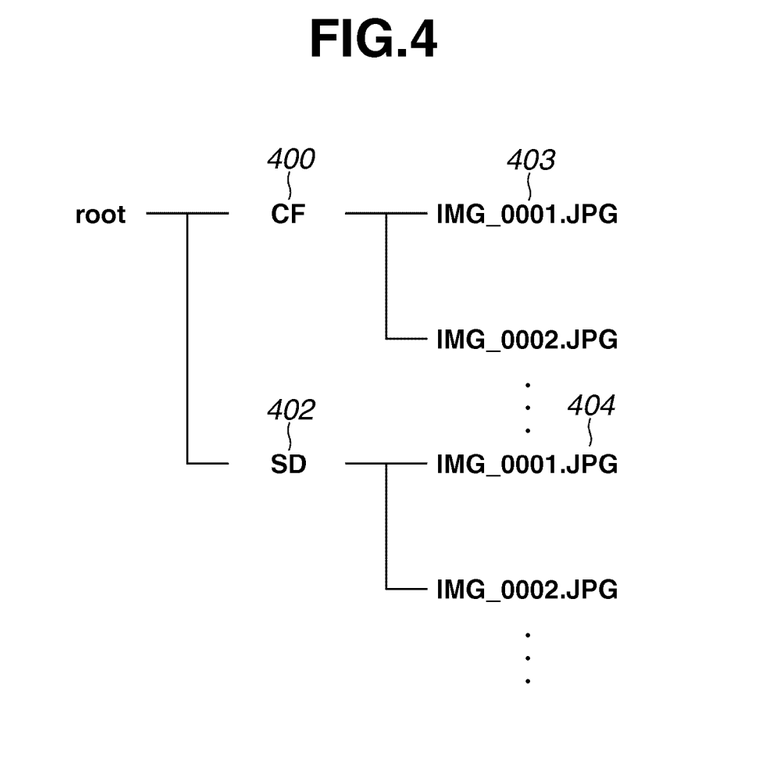
FIG. 4 illustrates a configuration of a folder of content that is stored in a recording medium and is disclosed to a display apparatus.

FIG. 4 illustrates a folder configuration of media content, which is generally called content, such as images and music files that are stored in a recording medium to be disclosed to a display apparatus. In this exemplary embodiment, there are recording media 130 consisted of a CompactFlash (CF) card and SD card.

In FIG. 4, the configuration has a file 403 including content IMG_0001.JPG and IMG_0002.JPG of the CF card, under a CF folder 400. The configuration also has a file 404 including content IMG_0001.JPG and IMG_0002.JPG of the SD card, under an SD folder 402.

Referring to FIG. 2 again, in S206, the digital camera 100 transmits the content information generated in S204 and S205 (e.g., information illustrate in FIGS. 3 and 4), in response to a request for the information from the display apparatus 200.

Next, processing in the digital camera 100 will be described in a case where control content is requested from the displays device 200 after the content information is provided to the display apparatus 200. In this exemplary embodiment, the provided content information includes control content (still image control content) of still images. The following is a description of processing in the digital camera 100 when the still image control content is requested from the display apparatus 200.

<Still Image Capturing Operation Sequence>

Figure 5:
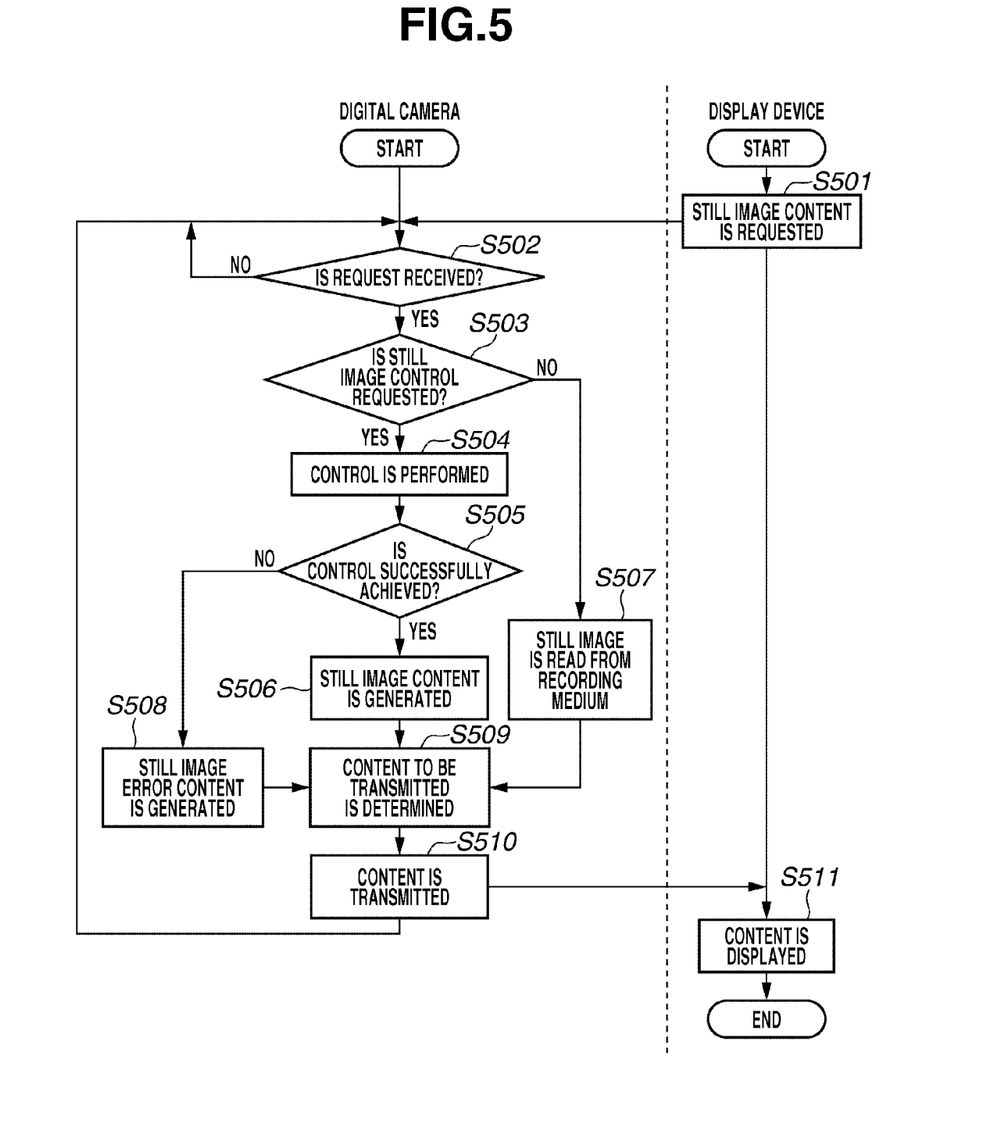
FIG. 5 is a flowchart illustrating a process to reproduce still images on a display apparatus, after content of the still image is requested from the display apparatus to a digital camera.

FIG. 5 is a flowchart illustrating operations for reproducing still images on a display apparatus after still image content is requested from the display apparatus to a digital camera.

In S501, the display apparatus 200 transmits a transmission request for still image content to the digital camera 100.

In S502, the digital camera 100 determines whether a request (transmission request) from the display apparatus 200 is received. When the digital camera 100 receives a request from the display apparatus 200 (YES in S502), the process goes to S503. When the digital camera 100 does not receive a request (NO in S502), the digital camera 100 waits for a request.

In S503, the digital camera 100 determines whether the request from the display apparatus 200 is about a start control of still image capturing. For example, the digital camera 100 determines whether the request is about a start control of still image capturing depending on whether the request includes "Release.JPG" 303. More specifically, the digital camera 100 determines that the request is control of a start of still image capturing when the request includes "Release.JPG" 303 (YES in S503), and the process goes to S504. When the request does not include "Release.JPG" 303 (i.e., the request includes a file name of still image such as xxxx.JPG) (NO in S503), the digital camera 100 determines that the request is not about a start control of still image capturing, and the process goes to S507.

In S504, the digital camera 100 performs a control to start capturing still images, and the process goes to S505.

In S505, the digital camera 100 determines whether the control in S504 is successfully achieved. When the control in S504 is successfully achieved (YES in S505), the process goes to S506. When the control in S504 fails (NO in S505), the process goes to S508.

In S506, the digital camera 100 generates still image content as a result of the capturing of still images. After the digital camera 100 generates still image content, the process goes to S509. In the generation, the digital camera 100 writes the still image content into both the memory 113 and the recording medium 130.

In S507, the digital camera 100 reads the requested still image content from the recording medium 130, and the process goes to S509. In the exemplary embodiment, if the request does not include the description of "Release.JPG", the request includes a file name such as xxxx.JPG that identifies still image content. The digital camera 100 reads the still image content from the recording medium 130, based on the file name.

In S508, the digital camera 100 generates error content in the same format as that of the still image content (i.e., .JPG file format), and the process goes to S509.

In S509, the digital camera 100 determines the content generated in S506 or S508, or the content read in S507 as transmission content.

In S510, the digital camera 100 transmits the content (still image content) determined in S509 to the display apparatus 200 that is the source of the request (the transmitter of the request). After the transmission, the process goes back to S502, where the digital camera 100 waits for a next request for content.

In S511, the display apparatus 200, which requested the still image content in S501 and waited for receipt of the content, receives and displays the still image content transmitted in S510.

The display apparatus 200 requests still image content based on content information that is provided from the digital camera 100 that serves as a content providing server, and displays (or reproduces) the still image content. In other words, the display apparatus 200 without any particular configuration can control capturing of still images in the digital camera 100, only by transmitting a request that includes control content "Release.JPG" (303) associated with a start control of still image capturing.

The configuration of the digital camera 100 and the operation flow for providing content information of this exemplary embodiment are similar to those in the case of still image content. In this exemplary embodiment, the provided content information includes control content of moving images, and the following is a description of operations to control the digital camera 100 when the moving image control content is requested from the display apparatus 200.

<Moving Image Capturing Operation Sequence>

Figure 6:
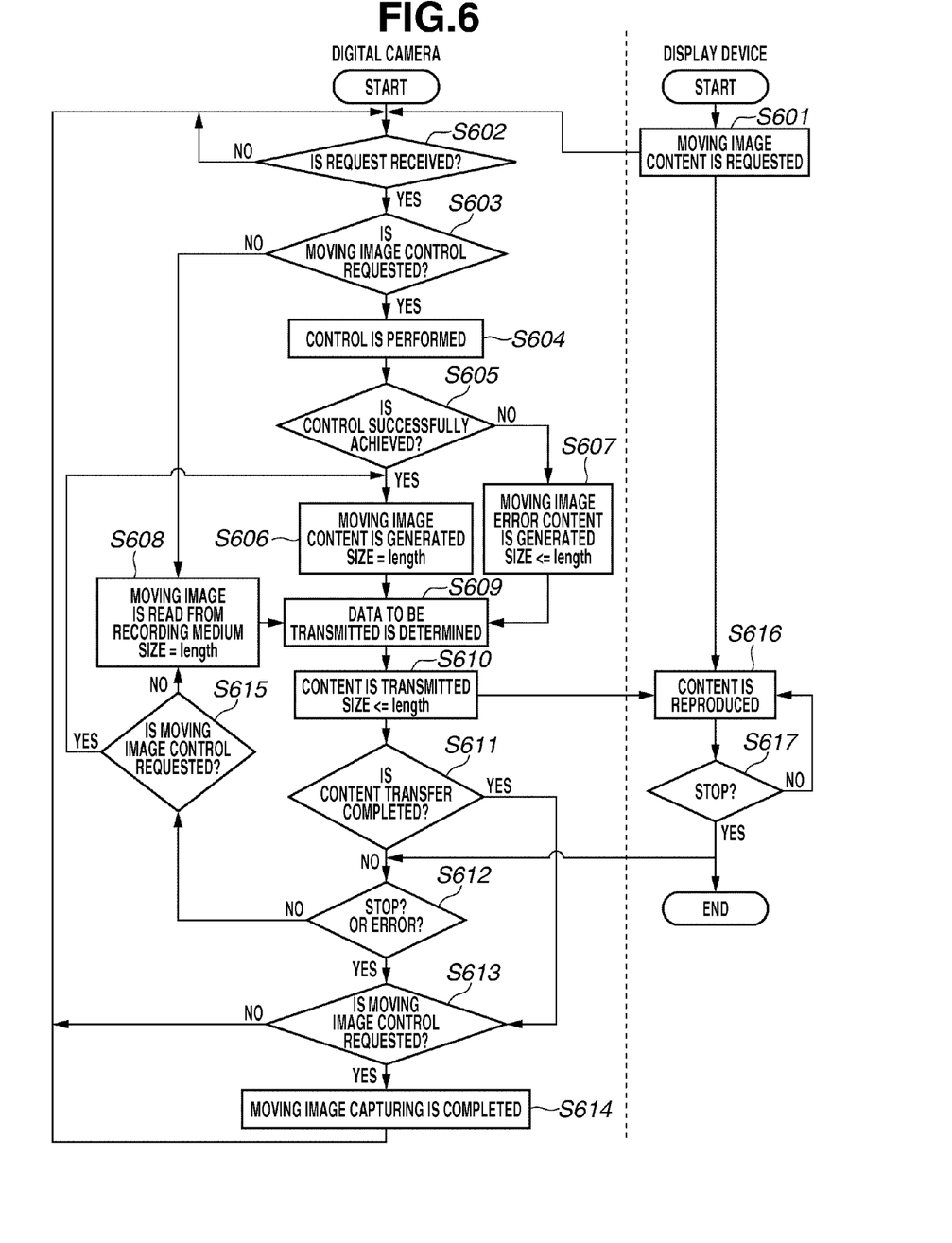
FIG. 6 is a flowchart illustrating a process to reproduce moving images on a display apparatus, after content of the moving images is requested from the display apparatus to the digital camera, until capturing moving images at a digital camera is stopped.

FIG. 6 is a flowchart illustrating operations for reproducing moving images on a display apparatus after the moving image content is requested from the display apparatus to a digital camera until the moving image capturing is stopped in the digital camera.

In S601, the display apparatus 200 transmits a request for transmission of moving image to the digital camera 100.

In S602, the digital camera 100 determines whether a request (transmission request) from the display apparatus 200 is received. When the digital camera 100 receives a request from the display apparatus 200 (YES in S602), the process goes to S603. When the digital camera 100 does not receive a request (NO in S602), the digital camera 100 waits for a request.

In S603, the digital camera 100 determines whether the request from the display apparatus 200 is about a start control of moving image capturing. For example, the digital camera 100 determines whether the request is about a start control of moving images capturing, depending on whether the request includes "Movie.MOV" 304. More specifically, the digital camera 100 determines that the request is a control of a start of moving images when the request includes "Movie.MOV" 304 (YES in S603), and the process goes to S604. When the request does not include "Movie.MOV" 304 (i.e., the request includes a file name of moving image such as xxxx.MOV) (NO in S603), the digital camera 100 determines that the request is not about a start control of moving images, and the process goes to S608.

In S604, the digital camera 100 performs a control to start capturing moving images, and the process goes to S605.

In S605, the digital camera 100 determines whether the control in S604 is successfully achieved. When the control in S604 is successfully achieved (YES in S605), the process goes to S606. When the control in S604 fails (NO in S605), the process goes to S607.

In S606, the digital camera 100 generates moving image content as a result of the capturing of moving images. When the request specifies a size (=length) of moving image content, the digital camera 100 generates moving image content of the size (hereinafter, referred to as requested size), and the process goes to S609. For example, the digital camera 100 generates a plurality of moving image content items of the requested size with the last item having a size smaller than the requested size. When the request does not specify a size of moving image content, the digital camera 100 generates moving image content of a predetermined size. The digital camera 100 writes the generated moving image content into both the memory 113 and the recording medium 130.

In S607, the digital camera 100 generates error content in the same format as that of the moving image content (i.e., .MOV file format), and the process goes to S609.

In S608, the digital camera 100 reads the requested moving image content from the recording medium 130, and the process goes to S609. In the exemplary embodiment, if the request does not include the description of "Movie.MOV", the request includes a file name such as xxxx.MOV that identifies moving image content. The digital camera 100 reads moving image content from the recording medium 130, based on the file name. When the request specifies a size (requested size) of moving image content, the digital camera 100 reads the moving image content in the requested size.

In S609, the digital camera 100 determines the content generated in S606 or S607, or the content read in S608 as transmission content.

In S610, the digital camera 100 transmits the transmission data determined in S609 in streaming to the display apparatus 200 (content transmission).

In S611, the digital camera 100 determines whether the content transmission is completed. When the entire content is transferred (YES in S611), the process goes to S613, whereas when some content remains to be transferred (NO in S611), the process goes to S612.

In S612, the digital camera 100 determines whether there is a request for capturing stop from the display apparatus 200, or whether the transmission failed. When there is a request for stop or the transmission failed (YES in S612), the process goes to S613, whereas if there is no request for stop or the transmission was a success (NO in S612), the process goes to S615.

In S615, the digital camera 100 shifts the process based on the determination result in S603. More specifically, when the digital camera 100 determines that the request from the display apparatus 200 is a start control of moving image capturing in S603, the process goes to S606, where the digital camera 100 determines a next transmission data (transmission content). In contrast, when the digital camera 100 determines that the request from the display apparatus 200 is not a start control of moving image capturing in S603, the process goes to S608, where the digital camera 100 reads next data from the recording medium 130.

Similarly, in S613, the digital camera 100 shifts the process based on the determination result in S603. More specifically, when the digital camera 100 determined that the request from the display apparatus 200 is a control to start capturing moving images in S603, the process goes to S614. In contrast, when the digital camera 100 determines that the request from the display apparatus 200 is not a control to start capturing moving images in S603, the serial operation ends and the process goes back to S602.

In S614, the digital camera 100 stops capturing moving images: the process goes to S602.

In S616, the display apparatus 200, which requested moving image content in S601 and is waiting for the content, receives the moving image content transmitted in S610 and simultaneously reproduces the received moving image content.

In S617, the display apparatus 200 determines whether there is a stop instruction from a user during the reproducing of content. When there is a stop instruction from a user during the reproducing of content (YES in S617), the display apparatus 200 transmits a stop request to the digital camera 100. When there is not a stop instruction from a user during the reproducing of content (NO in S617), the display apparatus 200 continues the reproducing.

The display apparatus 200 requests moving image content, based on content information provided from the digital camera 100 that serves as a content providing server, and reproduces the moving image content. In other words, the display apparatus 200 can control the capturing of moving images without any particular configuration in the digital camera 100, only by transmitting a request that includes control content "Movie.MOV" 304 associated with control of a start of still image capturing.

In the present exemplary embodiment, the provided content information includes control content for setting, and control of the digital camera 100 when the display apparatus 200 requested the control content for setting is described. Also, in this case, the configuration of the digital camera 100 and the operation flow for providing content information are similar to those in the case of still image content.

<Setting Control Sequence>

Figure 7:
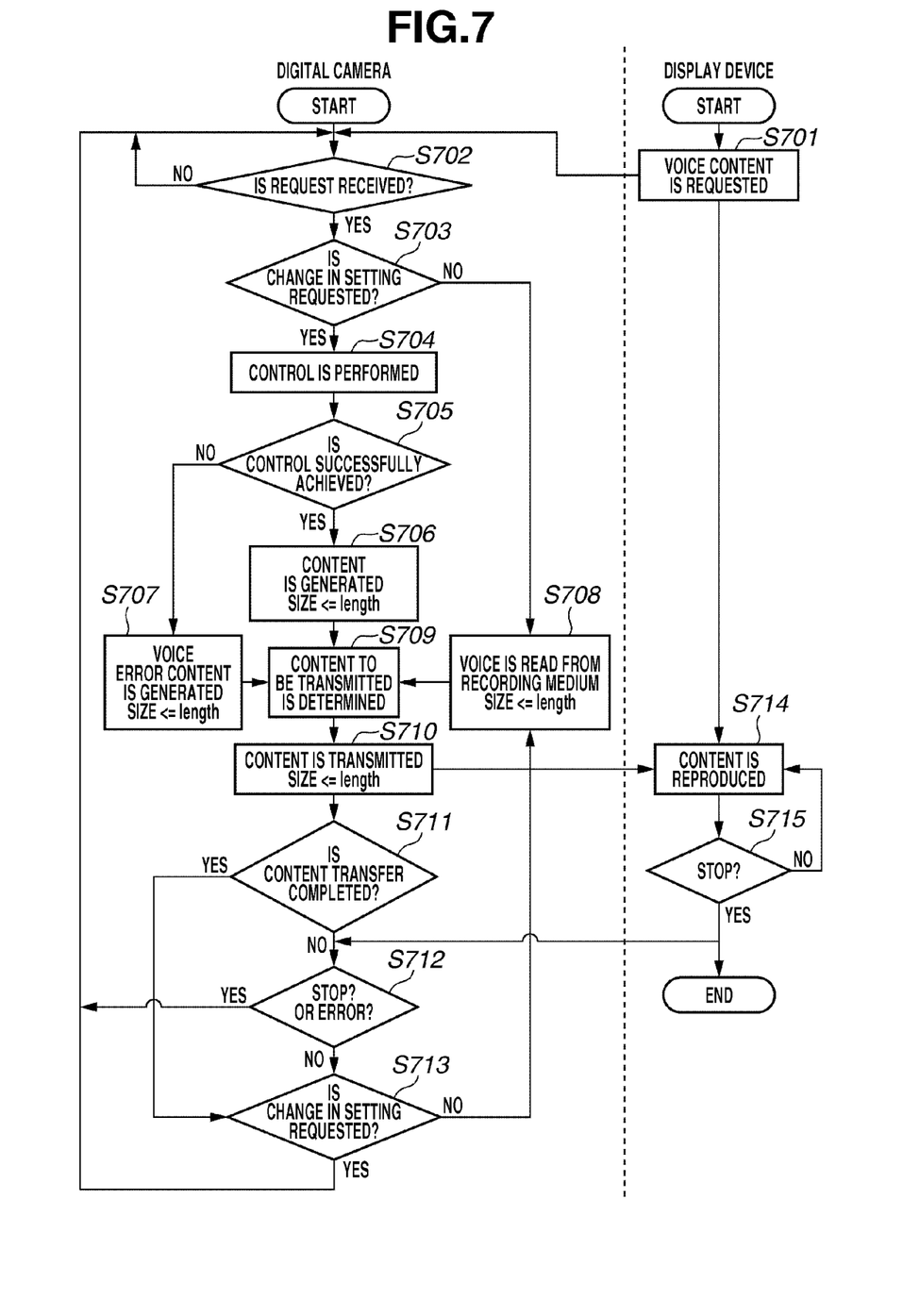
FIG. 7 is a flowchart illustrating a process to reproduce voice on a displays device after voice content is requested from a displays device to a digital camera.

FIG. 7 is a flowchart illustrating operations for reproducing still images on a display apparatus after the still image content is requested from the display apparatus to a digital camera.

In S701, the display apparatus 200 transmits a transmission request for voice content to the digital camera 100.

In S702, the digital camera 100 determines whether a request (transmission request) from the display apparatus 200 is received. When the digital camera 100 receives a request from the display apparatus 200 (YES in S702), the process goes to S703. When the digital camera 100 does not receive a request (NO in S602), the digital camera 100 waits for a request.

In S703, the digital camera 100 determines whether the request from the display apparatus 200 is a change in setting. For example, the digital camera 100 determines whether the request from the display apparatus 200 is a change in setting depending on whether the request includes "ISO100.MP3" 305. More specifically, the digital camera 100 determines that the request is a change in setting when the request includes "ISO100.MP3" 305 (YES in S703), and the process goes to S704. In contrast, the digital camera 100 determines that the request is not a change in setting when the request does not include "ISO100.MP3" 305 (i.e., the request includes a voice file name such as xxxx.MP3) (NO in S703). Then, the operation ends and the process goes to S708.

In S704, the digital camera 100 changes settings, and the process goes to S705.

In S705, the digital camera 100 determines whether the control in S704 was successfully achieved. When the control in S704 was successfully achieved in S704 (YES in S705), the process goes to S706. When the control failed in S704 (NO in S705), the process goes to S707.

In S706, the digital camera 100 generates content in a format corresponding to the format of control content that is associated with the change in setting, and the process goes to S709. In the present exemplary embodiment, the control content associated with the change in setting is in an MP3 format, and thereby the digital camera 100 generates voice content in MP3 format that notifies a change in setting. If the request specifies a size (=length) of voice content, the digital camera 100 generates voice content of a size equal to or less than the size (hereinafter, referred to as requested size). When the request does not specify a size of voice content, the digital camera 100 generates voice content of a predetermined size or less.

In S707, the digital camera 100 generates error content in the same format as that of the voice content (i.e., .MP3 file format), and the process goes to S709. The digital camera 100 generates the error content in a size equal to or smaller than the requested size.

In S708, the digital camera 100 reads the requested voice content from the recording medium 130, and the progress goes to S709. In the exemplary embodiment, if the request does not include "ISO100.MP3" 305, the request includes a file name such as xxxx.MP3 that identifies voice content. The digital camera 100 reads voice content from the recording medium 130, based on the file name. When the request specifies a size (requested size) of voice content, the digital camera 100 reads the voice content in the requested size or less than the requested size.

In S709, the digital camera 100 determines the content generated in S706 or S707, or the content read in S708 as transmission content.

In S710, the digital camera 100 transmits the transmission data determined in S709 in streaming to the display apparatus 200 (content transmission).

In S711, the digital camera 100 determines whether the content transmission is completed. When the entire content is transferred (YES in S711), the process goes to S713, whereas when some content remains to be transferred (NO in S711), the process goes to S712.

In S712, the digital camera 100 determines whether there is a request for capturing stop from the display apparatus 200, or whether the transmission failed. When there is a request for capturing stop or the transmission failed (YES in S712), the operation ends and the process goes to S702. When there is no request for capturing stop or the transmission was a success (NO in S712), the process goes to S713.

In S713, the digital camera 100 shifts the process based on the determination result in S703. More specifically, when the digital camera 100 determines that the request from the display apparatus 200 is a change in setting in S703, the operation ends and the process goes back to S702. In contrast, when the digital camera 100 determines that the request from the display apparatus 200 is not a change in setting in S703, the process goes back to S708, where the digital camera 100 reads next data from the recording medium 130.

In S714, the display apparatus 200, which requested voice content in S701 and is waiting for the content, receives the voice content transmitted in S710 and simultaneously reproduces the received voice content.

In S715, the display apparatus 200 determines whether there is a stop instruction from a user during the reproducing of content. When there is a stop instruction from a user during the reproducing of content (YES in S715), the display apparatus 200 transmits a stop request to the digital camera 100. When there is not a stop instruction from a user during the reproducing of content (NO in S715), the display apparatus 200 continues the reproducing.

The display apparatus 200 requests voice content, based on content information provided from the digital camera 100 that serves as a content providing server, and reproduces the voice content. In other words, the display apparatus 200 can change setting of the digital camera 100 without any particular configuration, only by transmitting a request that includes control content (e.g., ISO100.MP3 (305)) associated with change in setting.

In the present exemplary embodiment, the case of a change in setting associated with voice content is described, but the content may be still image or moving image, instead of voice content.

Other Embodiments

The present invention can be realized through the following processing: software (i.e., a program) that achieves the functions of the above exemplary embodiment is supplied to a system or apparatus via a network or storage medium, so that a computer in the system or apparatus (or CPU or MPU) reads and executes the program. The invention also can be realized through a non-transitory computer-readable storage medium having stored thereon, a program that causes a communication apparatus to perform a method of the invention.

According to the exemplary embodiments, the digital camera 100 makes control information associated with control content, generates the control content in a format corresponding to the format of control information, and discloses the control content as content information. This allows the display apparatus 200 to request any control content without discriminating the control content from ordinary content, and to display or reproduce the content in a format corresponding to the format of the requested content. Furthermore, the display apparatus 200 can control the digital camera 100 by requesting control content.

In other words, according to the above exemplary embodiments, an external apparatus such as the display apparatus 200 does not have to have information like a setting file, but can perform various controls on an image capturing apparatus such as the digital camera 100 that provides content.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-173437 filed Jul. 24, 2009, which is hereby incorporated by reference herein in its entirety.

What is claimed is:

1. A communication apparatus to transmit content recorded in a recording medium to an external apparatus in response to a request for the content from the external apparatus, the communication apparatus comprising:

a disclosure unit configured to disclose a plurality of control content items to the external apparatus, the plurality of control content items being used to cause the communication apparatus to perform processing for generating different contents in different formats;

a determination unit configured to determine one of the different formats of content to be generated based on one of the plurality of control content items requested from the external apparatus;

a generation unit configured to generate content by performing processing according to the determined format; and a transmission unit configured to transmit the content generated by the generation unit, wherein each control content item disclosed by the disclosure unit is in a format that is the same as the format of content generated in processing according to the requested control content item.

2. The communication apparatus according to claim 1, wherein the disclosure unit further is configured to disclose still-image generating content in a format that is the same as that of still image content generated by the communication apparatus, wherein the disclosed still-image generating content is configured to cause the communication apparatus to generate still image content.

3. The communication apparatus according to claim 2, further comprising an image capturing unit, wherein the still-image generating content further is configured to cause the communication apparatus to capture images using the image capturing unit and to generate still image content using the generation unit.

4. The communication apparatus according to claim 1, wherein the disclosure unit further is configured to disclose moving-image generating content in a format that is the same as that of moving image content generated by the communication apparatus, wherein the disclosed moving-image generating content is configured to cause the communication apparatus to generate moving image content.

5. The communication apparatus according to claim 4, further comprising an image capturing unit, wherein the moving-image generating content further is configured to cause the communication apparatus to capture images using the image capturing unit and to generate moving image content using the generation unit.

6. The communication apparatus according to claim 1, wherein the disclosure unit further is configured to disclose setting-changing content in a format of voice content, wherein the setting-changing content is configured to cause the communication apparatus to change settings of the communication apparatus.

7. The communication apparatus according to claim 1, wherein the disclosure unit further is configured to disclose a control content item by transmitting the control content item to the external apparatus that is the source of the request for the one of the plurality of control content items.

8. The communication apparatus according to claim 1, further comprising:

a second determination unit configured to determine whether the requested control content item is content for changing the setting of the communication apparatus; and a setting changing unit configured to change a setting corresponding to a requested control content item, when the requested control content item is the content for changing the setting of the communication apparatus, wherein the content generated by the generation unit is a content including a processing result provided by the setting changing unit, when the requested control content item is the content for changing the setting of the communication apparatus.

9. The communication apparatus according to claim 1, wherein if an error occurs when processing is performed according to the requested control content item, the generation unit generates a content informing of occurrences of the error in a same format as that of the control content items.

10. The communication apparatus according to claim 1, wherein the external apparatus requests any control content items without discriminating the control content items from ordinary content items and reproduces the content in a format corresponding to the format of the requested control content.

11. The communication apparatus according to claim 1, wherein the requested control content item includes setting information having the same format as the format of content generated in processing according to the requested control content item.

12. The communication apparatus according to claim 10, wherein the second determination unit is configured to determine whether the requested control content item is content for changing the setting of the communication apparatus by determining whether a file name of the requested control content item is a predetermined file name different from a file name of content generated in processing according to the requested control content item.

13. The communication apparatus according to claim 1, wherein the disclosure unit discloses a plurality of media content items to the external apparatus, the plurality of media content items being generated before the communication apparatus is connected to the external apparatus.

14. The communication apparatus according to claim 13, further comprising:
a third determination unit configured to determine whether the requested content item is the media content,
wherein the transmission unit transmits the content generated by the generation unit when the requested content item is the control content item, and
wherein the transmission unit transmits the requested content when the requested content item is the media content item.

15. The communication apparatus according to claim 1, wherein the communication apparatus communicates with the external apparatus according to a Transmission Control Protocol/Internet Protocol (TCP/IP).

16. The communication apparatus according to claim 15, wherein the disclosure unit discloses a plurality of content items to the external apparatus by operating the communication apparatus as a digital media server (DMS).

17. The communication apparatus according to claim 1, wherein the format includes a file type, and
wherein the control content item disclosed by the disclosure unit has a file type that is the same as the file type of content generated in processing according to the requested control content item.

18. The communication apparatus according to claim 1, wherein the format includes a file extension, and
wherein the control content item disclosed by the disclosure unit has a file extension that is the same as the file extension of content generated in processing according to the requested control content item.

19. A method of controlling a communication apparatus that transmits content recorded in a recording medium to an external apparatus, in response to a request for the content from the external apparatus, the method comprising:
disclosing a plurality of control content items to the external apparatus, the plurality of control content items being used to cause the communication apparatus to perform processing for generating different contents in different formats;
determining one of the different formats of content to be generated based on one of the plurality of control content items requested from the external apparatus;
generating content by performing processing according to the determined format; and
transmitting the generated content, wherein each disclosed control content item is in a format that is the same as the format of content generated in processing according to the requested control content item.

20. A non-transitory computer-readable storage medium having stored therein, a program that causes a communication apparatus to perform a method of controlling a communication apparatus that transmits content recorded in a recording medium to an external apparatus, in response to a request for the content from the external apparatus, the method comprising:
disclosing a plurality of control content items to the external apparatus, the plurality of control content items being used to cause the communication apparatus to perform processing for generating different contents in different formats;
determining one of the different formats of content to be generated based on one of the plurality of control content items requested from the external apparatus;
generating content by performing processing according to the determined format; and
transmitting the generated content, wherein each disclosed control content item is in a format that is the same as the format of content generated in processing according to the requested control content item.

21. A communication apparatus to transmit content recorded in a recording medium to an external apparatus in response to a request for the content from the external apparatus, the communication apparatus comprising:
a disclosure unit configured to disclose a plurality of control content items to the external apparatus, the plurality of control content items being used to cause the communication apparatus to perform processing for generating different contents having different file types;
a determination unit configured to determine one of the different file types of content to be generated based on one of the plurality of control content items requested from the external apparatus;
a generation unit configured to generate content by performing processing according to the determined file type; and
a transmission unit configured to transmit the content generated by the generation unit,
wherein each control content item disclosed by the disclosure unit has a file type that is the same as the file type of content generated in processing according to the requested control content item.

22. A communication apparatus to transmit content recorded in a recording medium to an external apparatus in response to a request for the content from the external apparatus, the communication apparatus comprising:
a disclosure unit configured to disclose a plurality of control content items to the external apparatus, the plurality of control content items being used to cause the communication apparatus to perform processing for generating different contents having different file extensions;
a determination unit configured to determine one of the different file extensions of content to be generated based on one of the plurality of control content items requested from the external apparatus;
a generation unit configured to generate content by performing processing according to the determined file extension; and
a transmission unit configured to transmit the content generated by the generation unit,
wherein each control content item disclosed by the disclosure unit has a file extension that is the same as the file extension of content generated in processing according to the requested control content item.

\* \* \* \* \*